United States Patent [19]
Wyles

[11] Patent Number: 5,128,534
[45] Date of Patent: Jul. 7, 1992

[54] HIGH CHARGE CAPACITY FOCAL PLANE ARRAY READOUT CELL

[75] Inventors: Richard H. Wyles, Cardiff; Albert E. Cosand, Agoura, both of Calif.

[73] Assignee: Hughes Aircraft Company, Los Angeles, Calif.

[21] Appl. No.: 554,238

[22] Filed: Jul. 17, 1990

[51] Int. Cl.⁵ .............................................. H01J 40/14
[52] U.S. Cl. ............................ 250/208.1; 358/213.27
[58] Field of Search ............. 250/208.1, 370.08, 338.1; 358/213.27, 213.31

[56] References Cited

U.S. PATENT DOCUMENTS 4,659,928 4/1987 Tew .................................. 250/370.08

OTHER PUBLICATIONS

A. F. Milton SPIE, vol. 443, pp. 110-119, Aug. 25-26, 1983.

Primary Examiner—David C. Nelms
Assistant Examiner—T. Davenport
Attorney, Agent, or Firm—C. D. Brown; R. M. Heald; W. K. Denson-Low

[57] ABSTRACT

A high charge capacity readout cell in a hybrid focal plane detector array on a complementary metal oxide semiconductor integrated circuit chip. An input transistor that provides a buffer for the detectors of the array, couples to a source of bias voltage, which controls the operation of the transistor. An integrating capacitor uses a variable source of terminating voltage to increase the amount of charge it integrates. A read signal causes an output transistor to read the charge from the capacitor to a readout line and to initialize the capacitor. The termination voltage of the integrating capacitor is changed during the time that the detector current is integrated, thus increasing the change in total voltage across the capacitor. This allows a greater amount of charge to be integrated with the capacitor which improves the signal-to-noise ratio of the focal plane array.

12 Claims, 2 Drawing Sheets

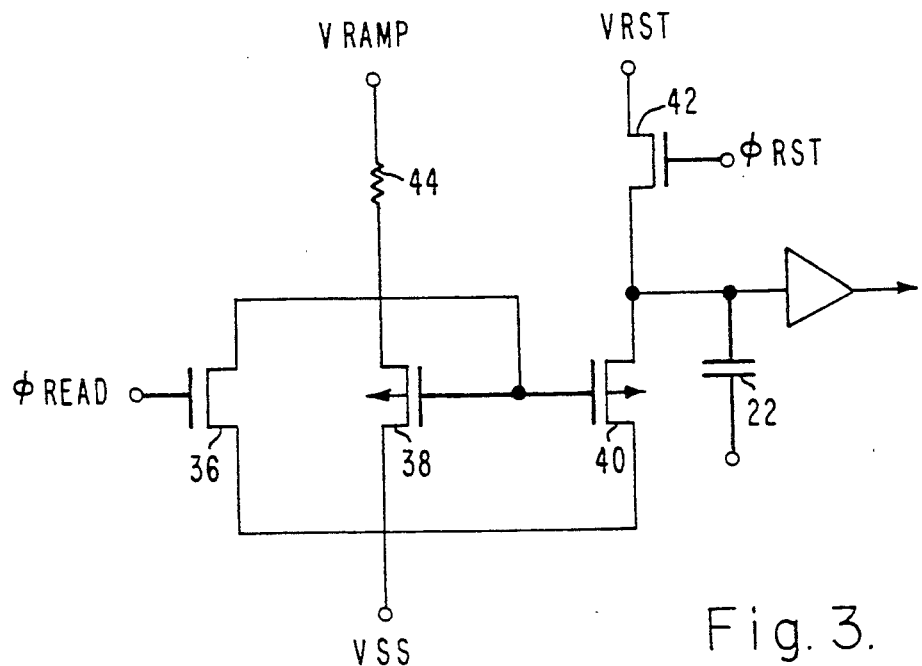
Fig. 3.
Fig. 4.
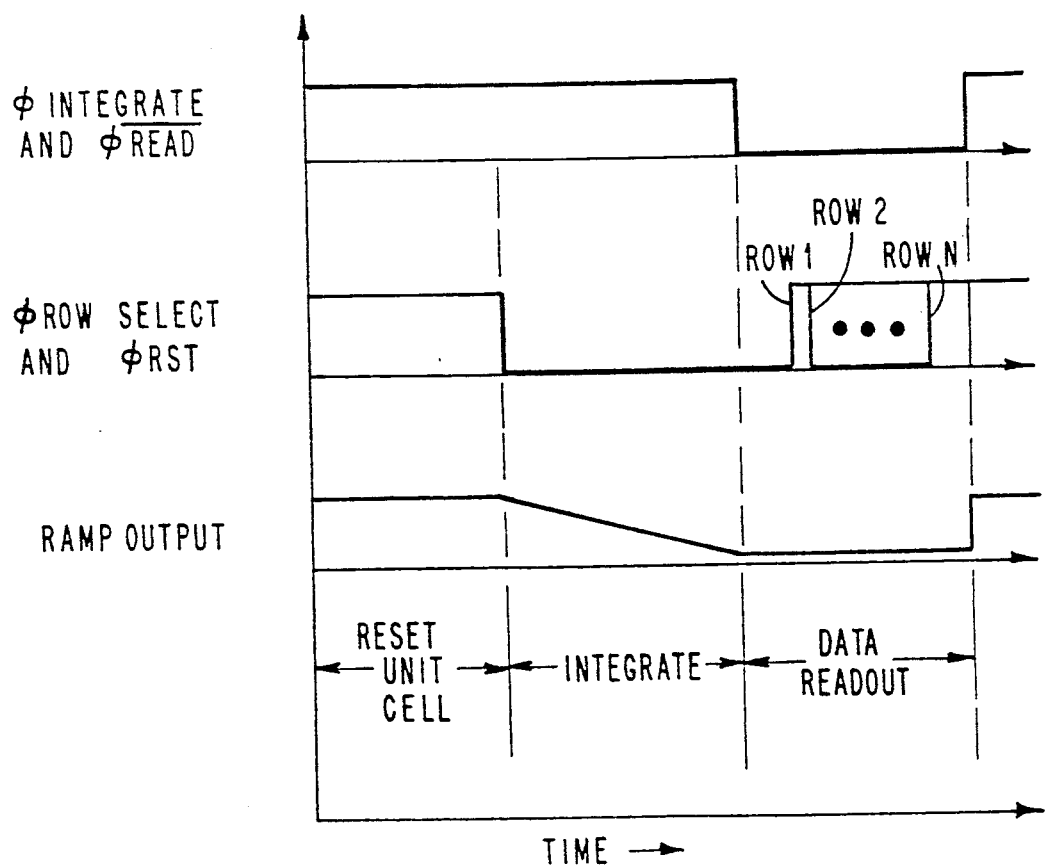

HIGH CHARGE CAPACITY FOCAL PLANE ARRAY READOUT CELL

BACKGROUND

The present invention relates to focal plane array technology, and more specifically, to a readout cell for use in hybrid and monolithic focal plane arrays.

In a hybrid focal plane array, arrays of photodetectors are coupled to or are part of an integrated circuit that includes integrating readout circuits and an output multiplexer. These circuits may be a hybrid focal plane array in which the detectors and the readout circuit are on separate substrates that are mechanically and electrically connected or monolithic focal plane arrays where the detectors and readout circuitry are fabricated in a common substrate.

A conventional hybrid staring infrared focal plane array typically employs an array or matrix of infrared detectors, made of some suitable material such as mercury cadmium telluride or indium antimonide, etc., attached by indium bumps (one per detector) to a readout array. The readout array integrates a photocurrent from each detector for a specified period of time, then multiplexes the signals from the detectors to a single video output (or a small number of outputs). Interface circuitry which sets detector bias voltage, integrates the photocurrent, and multiplexes the output signal, is contained in a repeated unit cell with the same dimensions as the detector spacing. The present state of the art for midwave and longwave hybrid infrared staring focal plane array, is a 128×128 array of detectors on 40 micron centers, and the trend of technology development is to larger arrays of smaller detectors. With a cell size of 40 $\mu$m or smaller, the limit to the signal to noise ratio is typically the shot noise in the number of photoelectrons that can be integrated into a capacitor in the unit cell. The limiting signal to noise ratio varies as the square root of the charge that can be integrated. A conventional direct injection circuit uses an integrating capacitor that is terminated in a fixed voltage. The maximum charge that can be integrated is the product of the capacitance and the voltage limit of the process. The shot noise on this charge sets the limit to the dynamic range of the focal plane array.

One class of circuit approaches that attempt to improve dynamic range include various gate modulation schemes. These circuits generally have problems with noise from sources other than shot noise, to the point that there is little or no real gain in dynamic range. They also may have problems with high sensitivity to fabrication process parameters, so that the circuit yield is likely to be low, and the circuits suffer from nonuniformity, and nonlinearity that makes nonuniformity correction difficult. Other known circuit approaches require high value resistors that are not normally available in commercial complementary metal oxide semiconductor (CMOS) processes and are difficult to control, so that yield is at risk and uniformity of response is degraded.

In some applications, an infrared focal plane array is required to have a quite large instantaneous dynamic range. A case of particular interest is an infrared focal plane array that is subjected to a high level of background infrared radiation from a hot, imperfectly transmitting window in front of the array, as, for example, in an infrared guided missile in which the window is subject to aerodynamic heating.

Reference is made to an article entitled "Readout mechanisms for infrared focal plane arrays," by A. F. Milton, published in the Proceedings of the SPIE, Volume 443, pages 110–119, Aug. 25-26, 1983. In this article, at page 116, and with reference to FIG. 10 on page 119, it is mentioned that ramping has been proposed as a technique to increase $N_{omax}$ in an IR MIS array. It is also mentioned that "Ramping will however not work if the background is variable. If the background heats up the array will saturate and if it cools off tunneling will occur."

Accordingly, it is an objective of the present invention to provide a readout arrangement for a focal plane array that is adapted to integrate a large amount of charge. Another objective of the invention is the provision of a readout arrangement for a focal plane array that has an improved signal-to-noise ratio. Yet another objective of the invention is the provision of a readout cell for a focal plane array that suppresses background signal due to a heated infrared dome. A still further objective of the present invention is to provide an improved readout cell for a focal plane array that operates over a large dynamic range. Another objective is to provide a readout design that does not require any unusual or unique processing steps, so that is can be fabricated with commercially available MOS or CMOS integrated circuit processes

SUMMARY OF THE INVENTION

In accordance with these and other objectives and advantages of the present invention, there is provided a focal plane array readout having enhanced charge storage capability. The invention is an integrating readout circuit for a focal plane array in which a termination voltage applied to an integrating capacitor is changed during the time that detector current is integrated. The change in total voltage across the capacitor is larger than in a conventional circuit, in which the capacitor termination voltage is held at a constant voltage level. This allows a greater amount of charge to be integrated with a given capacitor and a given voltage limit for the integrated circuit process.

A feature of the present invention is a circuit that solves a noise problem when imaging infrared energy through an aerodynamically heated infrared dome. The circuit provides a means that selectively suppresses part of the background signal, as from the hot dome, so that a higher gain can be used in employing the part of the signal that contains useful information. This technique provides excellent uniformity in increasing charge capacity and in suppressing background signal when it is implemented in standard MOS or CMOS large scale integrated circuit technology.

For midwave or longwave infrared focal plane arrays used in tactical imaging infrared guided missiles, the signal to noise ratio of the focal plane array generally is limited by shot noise. The limiting signal-to-noise ratio varies as the square root of the charge that can be integrated. This circuit increases the amount of charge that can be integrated, therefore improving the signal to noise ratio.

The present invention is fabricated using conventional MOS or CMOS processing. The ease with which the readout circuit is processed, provides a highly manufacturable approach to infrared focal plane arrays, with dynamic range suitable for high speed infrared guided missiles where aerodynamic heating of the infrared window is encountered. The circuit is robust enough, so that no yield penalty accompanies the high dynamic range, which makes it usable as a standard readout for applications where low cost and high production volumes are required.

BRIEF DESCRIPTION OF THE DRAWING

The various features and advantages of the present invention may be more readily understood with reference to the following detailed description taken in conjunction with the accompanying drawing, wherein like reference numerals designate like structural elements, and in which:

FIG. 3 shows an embodiment of a ramp generation circuit for use in the unit cells of FIGS. 1 and 2; and FIG. 4 shows ramp circuit timing diagrams for the circuit of FIG. 3.

DETAILED DESCRIPTION

Figure 1:
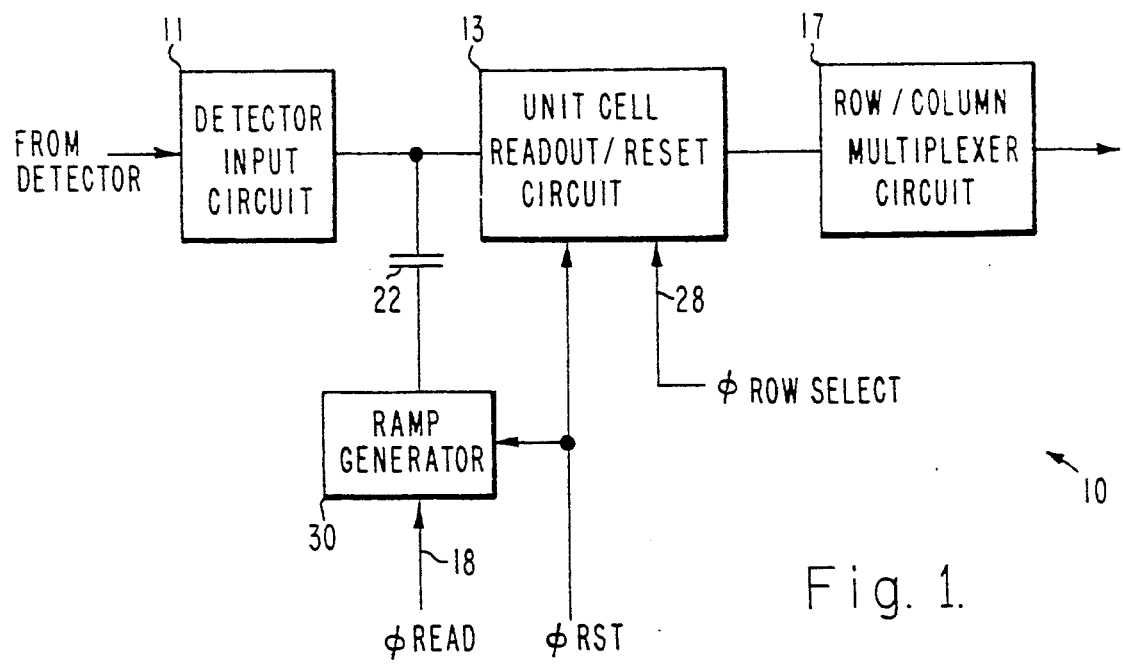
FIG. 1 is a generalized block diagram of a ramped capacitor unit cell in accordance with the principles of the present invention.

Referring to FIG. 1, it shows a generalized block diagram of a ramped capacitor unit cell 10 in accordance with the principles of the present invention. The unit cell 10 comprises a detector input circuit 11 whose output is coupled by way of a unit cell readout and reset circuit 13 to row and column multiplexer circuit 17. A unit cell integrating capacitor 22 is coupled between the output of the detector input circuit 11 and an output of a ramp generator circuit 30 constructed in accordance with the principles of the present invention. Several input signals are provided to the ramped capacitor unit cell 10 and include a φREAD signal coupled to the ramp generator circuit 30, a φROW SELECT signal coupled to the readout and reset circuit 13, and a φRST reset signal that is coupled to the ramp generator circuit 30 and the readout and reset circuit 13. One specific embodiment of this generalized ramped capacitor unit cell 10 is shown in FIG. 2, and will be described in detail hereinbelow.

Figure 2:
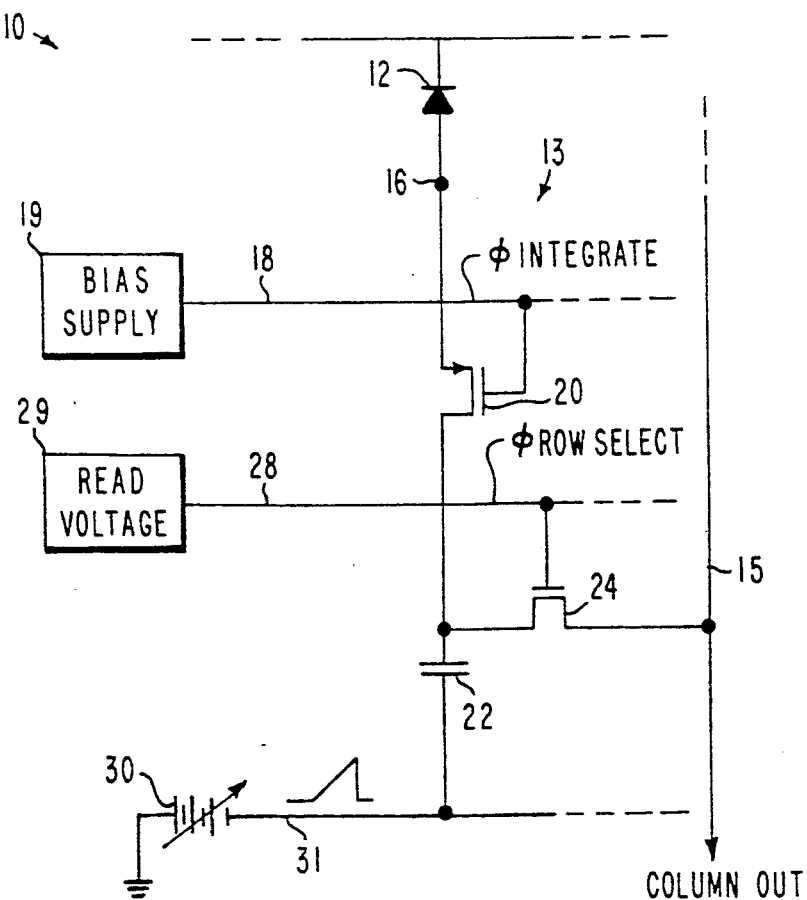
FIG. 2 is an electrical schematic diagram of an exemplary embodiment of a unit cell of an infrared focal plane array having a silicon readout circuit constructed in accordance with the principles of the present invention.

Referring now to FIG. 2, there is shown an exemplary embodiment of a unit cell 10 of an infrared focal plane array. A hybrid staring infrared focal plane array, for example, comprises a plurality of infrared detectors 12, made of some suitable material such as mercury cadmium telluride or indium antimonide, for example, electrically and mechanically attached by indium bumps 16, one per detector 12, to the readout and reset circuit 13. The readout and reset circuit 13 is adapted to integrate photocurrent from each detector 12, for a specified period of time, and couple the signals from the detectors 12 to a single video output, or to a small number of outputs, as desired, such as by way of the multiplexer circuit 17 of FIG. 1. The readout and reset circuit 13 is contained in a repeated unit cell 10 with the same dimensions as the spacing of the detectors 12. The present state of the art for midwave and longwave infrared focal plane arrays is an array of 128×128 detectors 12 on 40 micron centers. With a cell size of 40 $\mu$m or smaller, the limit of the signal to noise ratio is typically the shot noise in the number of photoelectrons that can be integrated in the unit cell 10.

The readout and reset circuit 13 shown in FIG. 1 is adapted for use with a direct readout multiplexer (not shown). The readout and reset circuit 13 is fabricated on a silicon chip using standard commercial CMOS LSI technology and comprises an input transistor 20 and an output transistor 24, which are coupled to the unit cell integrating capacitor 22. The transistors 20, 24 are MOSFET transistors, for example, each having a source, a gate and a drain. The source of the input transistor 20 is connected to the indium bump 16, while its drain is connected to the source of the output transistor 24 and to one side of the integrating capacitor 22.

A bias voltage source 19 is connected by way of a bias voltage line 18 to the gate of the input transistor 20 of each readout and reset circuit 13 in the same row. Similarly, a readout voltage source 29 is connected by way of a read line 28 to the gate of the output transistor 24 of each readout and reset circuit 13 in the same row. A terminating voltage provided by a variable ramp generation circuit 30 is connected by way of a terminating voltage line 31 to the other side of each integrating capacitor 22 of each readout and reset circuit 13 in the same row. The drain of the output transistor 24 of each readout and reset circuit 13 in the same column is connected to a column readout line 15 which leads to a row multiplexer (not shown).

In operation, the input transistor 20 operates in a common gate mode during integration, and buffers the detector 12 from the large voltage swing as the photocurrent is integrated on the integrating capacitor 22. The gate voltage of the input transistor 20 is set to properly bias the detector 12 during the integration time, then the gate of the input transistor 20 is switched more positive to turn the input transistor 20 off at the end of the integration time. The output transistor 24 is pulsed by way of the read line 28, causing the output transistor 24 to read out the charge on the capacitor 22 to the readout line 15, and then reset the voltage on the capacitor 22 prior to the next integration cycle.

In conventional readout and reset circuits that function in a manner similar to the readout and reset circuit 13 the terminating voltage that terminates the capacitor 22, is held at a fixed potential. The total voltage swing across the capacitor 22 is limited by the output transistor 24 and the minimum source drain voltage of the input transistor 20 at the other end. This allows approximately 4 to 5 volts of signal swing across the capacitor 22 for thin-oxide (CMOS) circuitry. The conventional readout and reset circuit 13 limits the total charge that can be integrated to a few times $10^7$ electrons.

At low to moderate incident fluxes, this may be sufficient to integrate all the photoelectrons generated within the maximum integration time allowed by other constraints. At higher flux levels, the integration time must be shortened to keep the total integrated charge (product of photocurrent and integration time), within the limits of the readout and reset circuit 13. The limit on charge storage is then equivalent to a limit on signal-to-noise ratio, since the signal-to-noise ratio is proportional to the square root of the number of photoelectrons observed when shot noise in the photocurrent is the dominant noise source.

In accordance with the principles of the present invention, these disadvantages of the conventional readout circuits are overcome by increasing the charge that is integrated into the integrating capacitor 22. This is accomplished by providing a means for slewing the terminating voltage during the integration time, thus increasing the total voltage change across the capacitor 22 during the integration. The terminating voltage is set at a few tenths of a volt voltage level when the capacitor 22 is reset, then it is ramped to a more negative voltage level of a few volts during the integration time. The total charge that may be integrated is increased, while the voltage of the bias voltage source 19 on the input transistor 20, and the voltage of the read line 28 on the output transistor 24, remain at their normal values. If the terminating voltage on the capacitor 22 is held constant at the more negative level during readout, a fixed charge is subtracted from the total integrated charge that is read out, effectively providing background suppression, which improves the dynamic range of the infrared focal plane array.

If the terminating voltage on capacitor 22 is slewed between upper and lower voltage limits, where the difference in voltage between the upper and lower limits is well controlled, then the final voltage across the integrating capacitor 22 is essentially independent of the slew rate of the ramp, and depends only on the total voltage swing of the ramp. The ramp is well enough controlled to avoid either breakdown or debiasing of the input transistor 20. Therefore, variations in the slew rate do not introduce noise into the integrated signal.

Alternatively, if the slew rate of the ramp is tightly controlled, and the time for which the voltage is ramped is controlled by the same signal that controls the integration time for the detector photocurrent, then the ratio of slew rate to integration time controls the total swing of the termination voltage of the integrating capacitor 22, thus providing an easy means to control the amount of charge that is subtracted off.

This alternative approach also offers a potential advantage in systems that accommodate an extremely high range of scene brightness, and use a very short integration time for very bright scenes. If the integration time is limited to a few tens of microseconds or less, variability in the integration time due to timing jitter in the control signals could introduce significant noise into the system if the capacitor termination is slewed over a precisely fixed voltage. However, when the ramp is operated at a precise slew rate, the variations in timing affect both the integrated charge from the photocurrent, and the net swing of the termination voltage in a similar manner, so as to provide significant cancellation of noise due to timing jitter. The voltage swing of the ramp may be dynamically adjusted to fit the observed brightness of the video output. If a great deal of background suppression is desired, the readout and reset circuit 13 may be adjusted to read out a only portion of the charge in the capacitor 22.

In accordance with the principles of the present invention, the readout and reset circuit 13 is constructed on an integrated circuit chip, with the semiconductor side of the capacitor 22 tied directly to the source-drain diffusion of the transistors 20, 24, which provides a compact design, thus maximizing the area available for the capacitor 22. The capacitor 22 is normally a metal oxide semiconductor (MOS) capacitor, with one side formed by a doped semiconductor layer, and the other side by the MOS transfer gate, having gate oxide for a dielectric. The gate material is usually polycrystalline silicon. The uniformity of MOS capacitors 22 is very good, perhaps ±1% variation across a die, so that the added capability of handling a larger signal does not degrade the uniformity of the focal plane array, which will still be dominated by differences among the detectors 12.

The side of the capacitor 22 that is to be driven by a ramp generator circuit 30 is polycrystalline silicon, which is insulated by dielectric from all diffusions. Therefore, the voltage of the ramp of the ramp generator circuit 30 is limited by the safe electric field across the dielectric, and generally is larger than could be obtained if the voltage were to be applied across a junction. A second layer of polycrystalline silicon, as is often used in analog processes, may be added to increase the value of the capacitor 22, if desired. No unusual or unique process steps that are not normally used in MOS processes are needed to fabricate the readout and reset circuit 13 of the present invention. This is a substantial advantage if the readout and reset circuit 13 is produced in high volumes, as most companies that operate high quality silicon foundries capable of producing fine geometry, thin oxide MOS or CMOS circuits with high yields, will not consider nonstandard processing.

The ramp generator circuit 30 may be on the chip or it may be supplied externally, as desired. If the ramp is generated on the chip, it may limit the total voltage swing of the ramp, which is the voltage that can be applied across the transistors 20, 24 on the chip. If the voltage ramp of the ramp generator circuit 30 is supplied externally it may complicate the drive electronics, but may allow a larger voltage swing to be used.

Referring to FIG. 3, it illustrates an embodiment of a specific ramp generator circuit 30 for use in the unit cells 10 of FIGS. 1 and 2. The ramp generator circuit 30 comprises first and second transistors 38, 40 whose gates are controlled by means of the φREAD signal that switches the first and second transistors 38, 40 on and off in accordance with the signals illustrated in FIG. 4. Two switching transistors 36, 42 are shown in FIG. 3 and are MOSFET transistors, for example. The φRAMP signal is coupled through a resistor 44 to the source of the first transistor 38 while the drain thereof is coupled to a bias supply VSS. The reset voltage VRST is coupled to the source of the second transistor 40. By controlling the switching of the two transistors 38, 40, the unit cell 10 operates to integrate detector charge and then read out the charge stored in the capacitor 22. With the φRST voltage signal high, and the φREAD signal low, the unit cell 10 is reset. Then the φRST signal is set low, causing the capacitor 22 to integrate detector current. Then the φREAD signal is set high causing the voltage stored on the capacitor 22 to be read out of the unit cell 10. This is seen more clearly in the timing diagrams shown in FIG. 4, which are self explanatory.

As discussed above, an increase in charge-handling capacity is realized when the bottom plate of the charge integration capacitor is ramped. This ramp voltage function has the following characteristics: it is reset to an initial voltage prior to the integration period; it varies approximately linearly with time during the integration period; and it stops changing, and is held constant, at the end of the integration period. The ramp generation circuitry may be adapted to control the slew rate (slope) of the ramp waveform. The ability to vary the ramp amplitude in this manner is an attractive feature of the present invention.

An alternative approach to ramp generation is to swing the ramp waveform between fixed upper and lower voltages, resulting in a fixed ramp amplitude. The slope of the ramp waveform may be positive or negative, depending upon the direction of signal current flow onto the integration capacitor. In this case, the slope of this waveform is always selected to tend to counteract the change in voltage due to signal current on the top plate of the integration capacitor.

The circuitry required to build a suitable ramp generator is quite simple, and many possible implementations exist. These circuits are very similar to electronic sawtooth generators commonly employed in many conventional circuits, such as CRT sweep circuits, for example.

Thus there has been described a new and improved high charge capacity readout cell for an infrared focal plane array. The readout cell provides a readout arrangement for a focal plane array that is adapted to integrate a large amount of charge by using a variable source of termination voltage. The termination voltage of the integrating capacitor is changed during the time that the detector current is integrated, thus increasing the change in total voltage across the capacitor. This permits a greater amount of charge to be integrated in the capacitor which improves the signal-to-noise ratio of the focal plane array. The high charge capacity readout cell integrates a greater amount of charge than conventional readout cells, which minimizes the effect of shot noise. The high charge capacity readout cell has a large dynamic range, which enables it to suppress background signal due to a heated infrared dome. The fabrication process of the readout cell is conventional MOS or CMOS processing. The readout cell is robust enough so that no yield penalty accompanies the improved dynamic range.

It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. A high charge capacity readout cell for use in a focal plane array that comprises an infrared detector for developing a photocurrent in response to infrared radiation received from a scene having a variable level of background radiation, and means for coupling the photocurrent from the detector to the readout cell, said readout cell comprising:

a detector input circuit for developing a photocurrent in response to infrared radiation;

an integrating capacitor coupled between the detector input circuit and a variable source of terminating voltage, the integrating capacitor providing a means for storing charge representative of the photocurrent developed by the detector, the terminating voltage determining the maximum amplitude of the charge stored in the capacitor; and a readout circuit coupled to the integrating capacitor and adapted to initialize the capacitor and couple charge from the integrating capacitor out of the readout cell;

whereby varying the terminating voltage applied to the capacitor increases the amplitude of the charge stored in the capacitor, thereby improving the signal-to-noise ratio and dynamic range of the readout cell.

2. The focal plane array readout of claim 1 wherein the variable source of terminating voltage comprises:

means for slewing the terminating voltage between upper and lower voltage limits, wherein the difference in voltage between the upper and lower limits is substantially constant;

whereby the final voltage across the integrating capacitor is substantially independent of the slew rate of the ramp, and depends only on the total voltage swing of the ramp, and whereby variations in the slew rate do not introduce noise into the integrated signal.

3. The focal plane array readout of claim 1 wherein the variable source of terminating voltage comprises:

means for slewing the terminating voltage between upper and lower voltage limits, wherein the slew rate of the ramp is substantially constant, and the time during which the voltage is ramped is controlled by the same signal that controls the integration time for current in the detector;

whereby the ratio of slew rate to integration time controls the total swing of the termination voltage of the integrating capacitor.

4. In an infrared focal plane array comprising a detector, a readout, and an electrical interconnect disposed therebetween, said readout comprising:

a bias voltage source;

a readout voltage source; and a readout circuit coupled to the bias and readout voltage sources, the readout circuit comprising an integrating capacitor, first and second switching devices and a readout line, and wherein the integrating capacitor is coupled to a source of terminating voltage, the bias voltage source is coupled to the first switching device and is adapted to couple current from the detector to the integrating capacitor, the second switching device is coupled between the capacitor and the readout line and is adapted to couple charge out of the readout circuit, the readout voltage source controlling the switching of the second device;

whereby varying the terminating voltage applied to the integrating capacitor increases the amplitude of the charge stored therein, thereby improving the signal-to-noise ratio and dynamic range of the readout.

5. The readout circuit of claim 4 wherein:

the first switching device comprises a first transistor coupled to the electrical interconnect and to the bias voltage source, wherein the bias voltage is adapted to control the switching of the first transistor;

the source of terminating voltage comprises a source of variable terminating voltage;

the integrating capacitor coupled to the first transistor and to the source of terminating voltage, the capacitor providing a means of storing a charge representative of the signal current developed by the detector, the variable terminating voltage determining the maximum amplitude of the charge stored in the integrating capacitor; and the second switching device comprises an output transistor coupled to the readout voltage source and coupled between the capacitor and the readout line.

6. A focal plane array readout having enhanced charge storage capability in which:

an integrating readout circuit for the focal plane array comprises means for providing a variable termination voltage to an integrating capacitor and for changing the termination voltage during the time that current in a detector coupled to the readout circuit is integrated;

whereby the change in total voltage across the capacitor is relatively large, thus allowing a greater amount of charge to be integrated with the capacitor.

7. The focal plane array readout of claim 6 wherein the means for providing a variable termination voltage comprises:

means for slewing the terminating voltage between upper and lower voltage limits, wherein the difference in voltage between the upper and lower limits is substantially constant;

whereby the final voltage across the integrating capacitor is substantially independent of the slew rate of the ramp, and depends only on the total voltage swing of the ramp, and whereby variations in the slew rate do not introduce noise into the integrated signal.

8. The focal plane array readout of claim 6 wherein the means for providing a variable termination voltage comprises:

means for slewing the terminating voltage between upper and lower voltage limits, wherein the slew rate of the ramp is substantially constant, and the time during which the voltage is ramped is controlled by the same signal that controls the integration time for current in the detector;

whereby the ratio of slew rate to integration time controls the total swing of the termination voltage of the integrating capacitor.

9. A focal plane array and readout cell arrangement disposed on an integrated circuit chip, said arrangement comprising:

an infrared detector adapted to develop a signal current in response to infrared radiation;

an indium bump interconnect adapted to couple the signal current from the detector to a readout cell;

an input transistor coupled to the electrical interconnect and having its gate coupled to a source of bias voltage;

an integrating capacitor coupled between the input transistor and a variable source of terminating voltage, the integrating capacitor providing a means for storing charge representative of the photocurrent developed by the detector, the terminating voltage determining the maximum amplitude of the charge stored in the capacitor, and an output transistor coupled between the capacitor and a readout line, and having its gate coupled to a readout voltage source that is adapted to provide a readout voltage thereto that controls the switching of the output transistor, the readout line adapted to couple charge from the integrating capacitor out of the readout cell and adapted to initialize the capacitor;

whereby varying the terminating voltage applied to the capacitor increases the amplitude of the charge stored in the capacitor thereby improving the signal-to-noise ratio and dynamic range of the readout cell.

10. A high charge capacity readout cell for use in a focal plane array that comprises an infrared detector for developing a photocurrent in response to infrared radiation, and an electrical interconnect for coupling the photocurrent from the detector to the readout cell, said readout cell comprising:

an input transistor coupled to the electrical interconnect and having its gate coupled to a source of bias voltage;

an integrating capacitor coupled between the input transistor and a variable source of terminating voltage, the integrating capacitor providing a means for storing charge representative of the photocurrent developed by the detector, the terminating voltage determining the maximum amplitude of the charge stored in the capacitor; and an output transistor coupled between the capacitor and a readout line, and having its gate coupled to a readout voltage source that is adapted to provide a readout voltage thereto that controls the switching of the output transistor, the readout line adapted to couple charge from the integrating capacitor out of the readout cell and adapted to initialize the capacitor;

whereby varying the terminating voltage applied to the capacitor increases the amplitude of the charge stored in the capacitor thereby improving the signal-to-noise ratio and dynamic range of the readout cell.

11. The focal plane array readout of claim 10 wherein the variable source of terminating voltage comprises:

means for slewing the terminating voltage between upper and lower voltage limits, wherein the difference in voltage between the upper and lower limits is substantially constant;

whereby the final voltage across the integrating capacitor is substantially independent of the slew rate of the ramp, and depends only on the total voltage swing of the ramp, and whereby variations in the slew rate do not introduce noise into the integrated signal.

12. The focal plane array readout of claim 10 wherein the variable source of terminating voltage comprises:

means for slewing the terminating voltage between upper and lower voltage limits, wherein the slew rate of the ramp is substantially constant, and the time during which the voltage is ramped is controlled by the same signal that controls the integration time for current in the detector;

whereby the ratio of slew rate to integration time controls the total swing of the termination voltage of the integrating capacitor.

* * * * *